United States Patent
Xu et al.

(10) Patent No.: US 9,966,828 B2
(45) Date of Patent: May 8, 2018

(54) VIBRATION MOTOR

(71) Applicants: Hongfu Xu, Shenzhen (CN); Zhilin Chai, Shenzhen (CN); Na Wu, Shenzhen (CN)

(72) Inventors: Hongfu Xu, Shenzhen (CN); Zhilin Chai, Shenzhen (CN); Na Wu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 362 days.

(21) Appl. No.: 15/011,492

(22) Filed: Jan. 30, 2016

(65) Prior Publication Data
US 2017/0012514 A1 Jan. 12, 2017

(30) Foreign Application Priority Data

Jul. 8, 2015 (CN) ...................... 2015 2 0490017 U

(51) Int. Cl.
H02K 33/16 (2006.01)
H02K 33/18 (2006.01)

(52) U.S. Cl.
CPC ............ *H02K 33/18* (2013.01); *H02K 33/16* (2013.01)

(58) Field of Classification Search
CPC .......................................... H02K 33/00–33/18
See application file for complete search history.

(56) References Cited

U.S. PATENT DOCUMENTS

2011/0018365 A1* 1/2011 Kim ....................... B06B 1/045
310/17

* cited by examiner

*Primary Examiner* — Ramon M Barrera
(74) *Attorney, Agent, or Firm* — Na Xu; IPro, PLLC

(57) ABSTRACT

A vibration motor is provided in the present disclosure. The vibration motor includes a housing providing an accommodating space, a magnet assembly accommodated within the accommodating space, and a coil assembly for driving the magnet assembly. The magnet assembly includes a first magnet module and a second magnet opposite to each other, the coil assembly includes a coil and a coil support for supporting the coil. The coil support includes a support body and a plurality of supporting legs. The supporting legs extend from the support body and are fixed to the housing. The coil is supported by the support body between the first magnet module and the second magnet module.

14 Claims, 3 Drawing Sheets

VIBRATION MOTOR

FIELD OF THE DISCLOSURE

The present disclosure relates to vibration motor technologies, and more particularly, to a vibration motor applicable to a mobile device.

BACKGROUND

With development of mobile electronic technology, mobile devices, such as mobile phones, handheld game players, navigation devices, handheld multimedia entertainment apparatuses, or the like, become more and more popular. Generally, the mobile devices use vibration motors to provide system feedback, such as incoming call or message prompting in a mobile phone, or vibration feedback in a potable game player.

In a related vibration motor, a magnet is provided at one side of a coil, and a magnet circuit is provided at the other side of the coil. With this configuration, however, a magnetic field generated by the coil in the vibration motor is incapable of provide sufficient driving force to drive the vibration motor to perform necessary vibration.

Accordingly, it is necessary to provide a new vibration motor to overcome the aforesaid drawbacks.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and the embodiment thereof.

Figure 1:
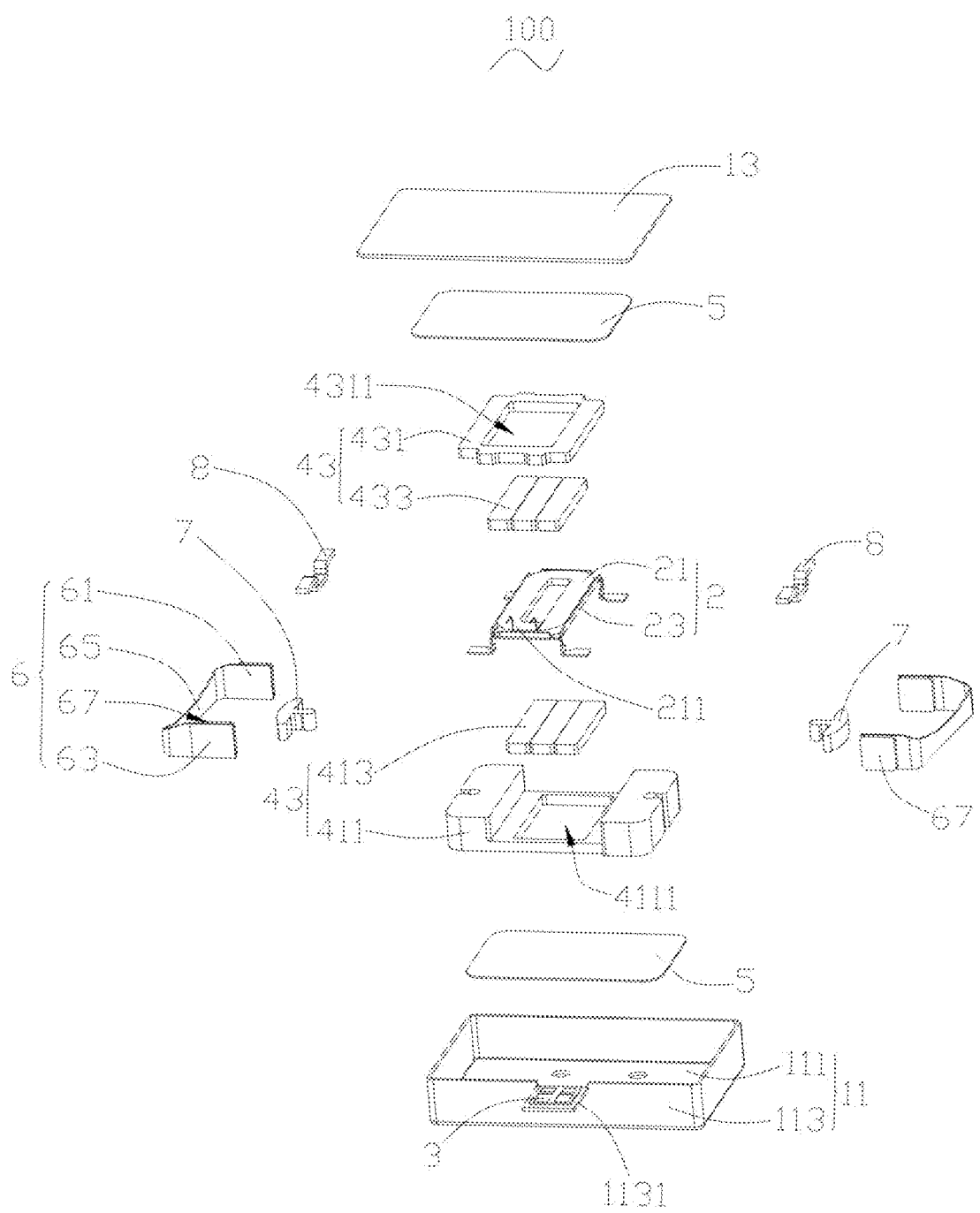
FIG. 1 is an exploded view of a vibration motor according to an embodiment of the present disclosure.
Figure 2:
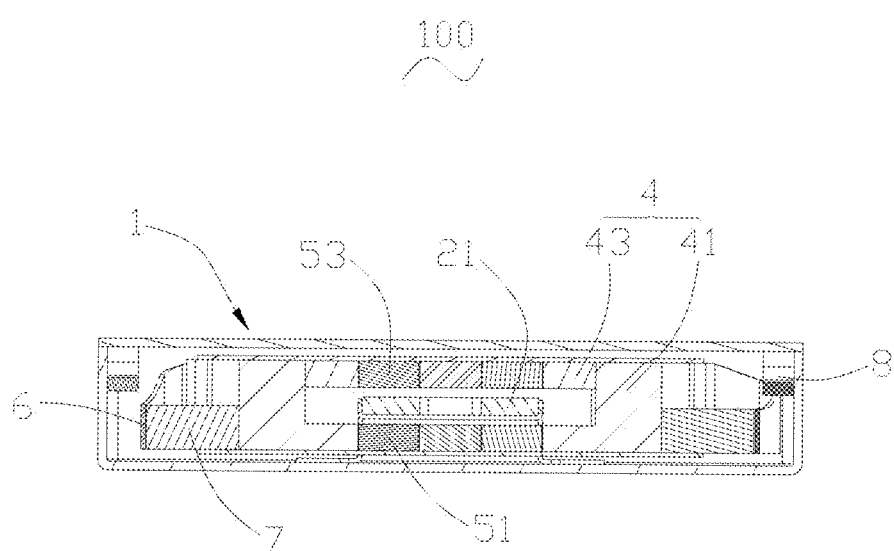
FIG. 2 is an assembled, cross-sectional view of the vibration motor of FIG. 1.

Referring to FIG. 1 and FIG. 2, a vibration motor 100 according to an embodiment of the present disclosure includes a stationary part and a vibration part.

The stationary part includes a housing 1, a coil assembly 2 and a circuit board 3. The housing 1 provides an accommodating space for receiving the coil assembly 2 and a supporting platform 1131 for supporting the circuit board 3. The coil assembly 2 may be connected with an external circuit via the circuit board 3 to receive an electrical signal.

Specifically, the housing 1 includes a main casing 11 and a cover plate 13 covering the main casing 11 for forming the accommodating space. The main casing 11 includes a bottom plate 111 and four sidewalls 113 extending perpendicularly from the bottom plate 111. One of the sidewalls 113, which is next to the coil assembly 2, includes an extending board extending outward perpendicularly at a middle top region thereof to form the supporting platform 1131, and the supporting platform 1131 is configured for supporting the circuit board 3.

The coil assembly 2 includes a coil 21 and a coil support 23 for supporting the coil 21. The coil 21 may include a pair of lead wires 211, the lead wires 211 extend from an end of the coil 21 facing the supporting platform 1131. Moreover, the lead wires 211 are attached on the sidewall 113 corresponding to the supporting platform 1131, and are spot welded to a surface of the circuit board 3.

Figure 3:
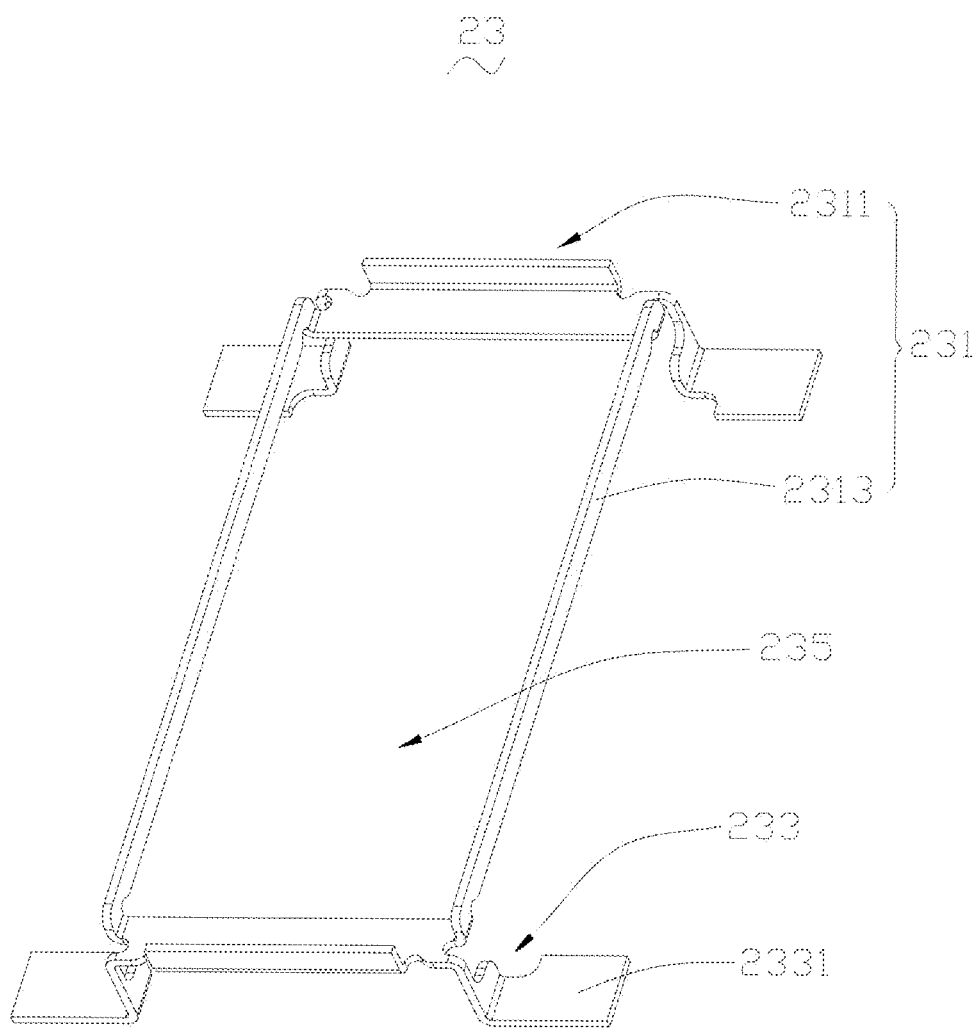
FIG. 3 is a schematic view of a coil support of the vibration motor of FIG. 1.

Referring also to FIG. 3, the coil support 23 includes a support body 231 and a plurality of supporting legs 233 bent and extending downwards from four corners of the support body 231. The support body 231 includes two supporting portions 2311 that are disposed opposite to each other, and two connecting ribs 2313 for connecting the two supporting portions 2311 end to end. Each of the supporting portions 2311 is L-shaped and includes a supporting plate and a block plate extending perpendicularly from an outer edge of the supporting plate. The supporting plates of the two supporting portions 2311 are level with each other to support the coil 21. The block plates of the two supporting portions 2311 cooperate with the two connecting ribs 2313 for forming an accommodating structure 235 for accommodating the coil 21. The coil 21 is surrounded by the accommodating structure 235 and thus movement of the coil 21 is restricted. The accommodating structure 235 can reduce loss of the magnetic field, which is caused by the coil support 23.

The supporting legs 233 extend from ends of the supporting portions 2311. Each of the supporting legs 233 includes a first extending portion 2331 that extends downwards from the supporting portion 2311, and a second extending portion 2333 extending perpendicularly from the first extending portion 2331. The supporting legs 233 can be fixed to the bottom plate 111 of the main casing 11 by the second extending portion 2333, for example, by welding.

In this embodiment, the coil support 23 includes four supporting legs 233 which are respectively formed at four corners of the support body 231. In other alternative embodiments, the number of the supporting legs 233 is not limited to four, and the coil support 23 may also have other suitable number of supporting legs 233.

The circuit board 3 may be a regular printed circuit board, and is disposed on the surface of the supporting platform 1131. The circuit board 3 may be shaped as the supporting platform 1131, for example, to be a rectangular board, and a size of the circuit board 3 is smaller than that of the supporting platform 1131. In other alternative embodiments, the circuit board 3 may also be provided in other suitable manners, and no limitation is made thereto by the present disclosure.

The vibration part is accommodated within the accommodating space of the housing 1, and the vibration part includes a magnet assembly 4, a pair of pole plates 5 and an elastic connector 6. The pair of pole plates 5 is respectively disposed at two opposite sides of the magnet assembly 4, and the magnet steel assembly 4 is suspended within the accommodating space by the elastic connector 6.

The magnet assembly 4 includes a first magnet module 41 and a second magnet module 43 that are disposed opposite to each other. The first magnet module 41 includes a first mass block 411 and a first magnet 413 accommodated within the first mass block 411. The first mass block 411 has a bottom and a pair of side portions extending from two opposite ends of the bottom, and the bottom includes a first receiving hole 4111 for receiving the first magnet 413.

The second magnet assembly 43 includes a second mass block 431 and a second magnet 433 accommodated within the second mass block 431. The second mass block 431 may be a mass plate, and includes a second receiving hole 4311 for receiving the second magnet 433.

In the magnet assembly 4, the second mass block 431, accompany with the second magnet 433, can be received between the two side portions of the first mass block 411, and is separated from the bottom of the first mass block 411 at a certain distance. In other words, the two side portions and the bottom of the first mass block 411 cooperatively form a groove for receiving the second mass block 431 and the second magnet 433. The above-mentioned distance between the bottom and the second mass block 431 can ensure the first magnet 413 and the second magnet 433 to be opposite to and spaced apart from each other.

In this embodiment, the coil 21 is supported between the first magnet module 41 and the second magnet module 43 by the coil support 23; more specifically, the coil 21 is suspended within a gap between the bottom of the first mass block 411 and the second mass block 431 by the coil support 23. A length of each of the two connecting ribs 2313 of the support body 231 should be greater than that of the bottom of the first mass block 411, so that the support body 231 is capable of extending across the bottom of the first mass block 411; and a height of the first extending portion 2331 of the supporting leg 233 should be greater than a thickness of the bottom of the first mass block 411 so that the coil 21 can be suspended between the first magnet module 41 and the second magnet module 43.

The pole plates 5 may be made of magnetic material. The pole plates 5 are configured for shielding the magnetic field in the vibration motor 100 so as to reduce magnetic leakage of the vibration motor 100.

The elastic connector 6 includes a pair of U-shaped elastic connecting members, each of which includes a first connecting portion 61, a second connecting portion 63 and a third connecting portion 65 for connecting the first connecting portion 61 and the second connecting portion 63. Each of the U-shaped elastic connecting members is connected to the housing 1 and a corresponding end of the first mass block 411 respectively via the first connecting portion 61 and the second connecting portion 63. The third connecting portion 65 is disposed spaced apart from the housing 1. To enhance a connecting strength of the elastic connector 6, a pad 67 is disposed on at least one of the first connecting portion 61 and the second connecting portion 63.

Furthermore, the vibration motor 100 may further include a pair of dampers 7 and a pair of blocking members 8. Each of the dampers 7 is disposed between the third connecting portion 65 of a corresponding U-shaped elastic connecting member and the magnet assembly 4. Each of the blocking members 8 is disposed between a corresponding U-shaped elastic connecting member and the main casing 11, and is fixed to the bottom plate 111. The dampers 7 can be deformed elastically to decrease relative motion between the magnet assembly 4 and the elastic connector 6, thereby protecting the vibration motor 100 from suffering collision failure. The blocking members 8 can restrict collision between the elastic connector 6 and the main casing 11.

When the vibration motor 100 operates, the coil assembly 2 generates a magnetic field in response to an electrical signal received by the circuit board 3, the magnetic field drives the magnet assembly 4 to motion and thus the vibration motor 100 vibrates. In this embodiment, the coil 21 is suspended between the first magnet module 41 and the second magnet module 43 by the coil support 23, the first magnet module 41 and the second magnet module 43 provides two magnetic circuits at two opposite sides of the coil 21. This can improve a utilization efficiency of the magnetic field generated by the coil 21, thereby providing sufficient driving force to drive the vibration motor 100 to perform necessary vibration. As such, a performance of the vibration motor 100 can be improved with a simple structure, and the vibration motor 100 can be applicable to the mobile device in practice.

In other alternative embodiments, roles of the coil assembly 2 and the magnet assembly 4 may be exchanged. For example, the coil assembly 2 may be a part of the vibration part, and the magnet assembly 4 may be a part of the stationary part.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
a housing providing an accommodating space;
a magnet assembly accommodated within the accommodating space; and
a coil assembly for driving the magnet assembly;
wherein the magnet assembly comprises a first magnet module and a second magnet module opposite to each other, the coil assembly comprises a coil and a coil support for supporting the coil, the coil support comprises a support body and a plurality of supporting legs, the supporting legs extend from the support body and are fixed to the housing; the coil is supported by the support body between the first magnet module and the second magnet module.

2. The vibration motor of claim 1, wherein the support body comprises two supporting portions opposite to each other, and two connecting ribs connecting the two supporting portions for forming an accommodating structure for accommodating the coil.

3. The vibration motor of claim 2, wherein each of the two supporting portions are L-shaped.

4. The vibration motor of claim 3, wherein the supporting legs respectively extend from ends of the supporting portions.

5. The vibration motor of claim 4, wherein each of the supporting legs comprises a first extending portion that extends from a corresponding end of the supporting portion, and a second extending portion that extends perpendicularly from the first extending portion.

6. The vibration motor of claim 5, wherein the coil support is fixed to the housing by the second extending portion of the supporting leg.

7. The vibration motor of claim 6, wherein the housing comprises a main casing and a cover plate covering the main casing, the main casing has a bottom plate and a plurality of sidewalls extending perpendicularly from the bottom plate, and the supporting legs are fixed on the bottom plate.

8. The vibration motor of claim 1, wherein the first magnet module comprises a first mass block and a first magnet accommodated within the first weight balancing block, and the second magnet module comprises a second mass block and a second magnet accommodated within the second mass block.

9. The vibration motor of claim 8, wherein the first mass block has a bottom and two side portions extending from two opposite ends of the bottom, the bottom comprises a first receiving hole for receiving the first magnet.

10. The vibration motor of claim 9, wherein the second mass block is a mass plate, and comprises a second receiving hole for receiving the second magnet.

11. The vibration motor of claim 10, wherein a groove is formed between the two side portions of the first mass block; the second mass block is received in the groove and separated from the bottom of the first mass block.

12. The vibration motor of claim 11, wherein the coil is supported within a gap between the bottom of the first mass block and the second mass block by the support body.

13. The vibration motor of claim 12, wherein a length of the connecting rib of the support body are greater than a length of the bottom of the first mass block, and the support body extends across the bottom of the first mass block.

14. The vibration motor of claim 12, wherein a height of the supporting leg of the coil support are greater than a thickness of the bottom of the first mass block, and the coil is suspended between the first magnet module and the second magnet module.

* * * * *